(12) United States Patent
Kilgore

(10) Patent No.: US 6,390,131 B1
(45) Date of Patent: May 21, 2002

(54) RETAINING CLIP AND ASSEMBLY FOR INTERNAL DAMPENING ELEMENT

(75) Inventor: Jason T. Kilgore, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/662,943

(22) Filed: Sep. 15, 2000

(51) Int. Cl.[7] ................................................ F16L 55/04
(52) U.S. Cl. ......................... 138/30; 138/108; 138/112; 123/456
(58) Field of Search ............................. 138/28, 30, 108, 138/112; 123/456

(56) References Cited

U.S. PATENT DOCUMENTS

| | | | |
|---|---|---|---|
| 596,062 A | 12/1897 | Firey | |
| 1,058,572 A | 4/1913 | Finlay | |
| 2,599,325 A | 6/1952 | Fritzberg | |
| 3,665,967 A * | 5/1972 | Kachnik | 138/30 |
| 4,056,679 A | 11/1977 | Brandt et al. | |
| 4,456,058 A * | 6/1984 | Powell | 138/112 |
| 4,607,665 A * | 8/1986 | Williams | 138/114 |
| 4,651,781 A * | 3/1987 | Kandelman | 138/30 |
| 4,897,906 A * | 2/1990 | Bartholomew | 138/30 |
| 5,018,260 A * | 5/1991 | Ziu | 138/108 |
| 5,538,043 A * | 7/1996 | Salazar | 138/28 |
| 5,575,262 A | 11/1996 | Rohde | |
| 5,617,827 A | 4/1997 | Eshleman et al. | |
| 5,709,248 A * | 1/1998 | Goloff | 138/30 |

* cited by examiner

Primary Examiner—James Hook

(57) ABSTRACT

A fuel rail assembly is disclosed. The assembly includes a generally hollow fuel rail, a fluid dampening element and a clip. The fuel rail has an inner wall and a longitudinal rail axis extending therethrough. The fluid dampening element is disposed within the fuel rail and has a cross-sectional configuration. The clip includes an interior portion having a cross-sectional opening corresponding to and surrounding the cross-sectional configuration of the fluid dampening element and a plurality of exterior portions extending from the interior portion. Each of the plurality of exterior portions has an engagement end distal from the interior portion, with at least one of the engagement ends engaging the inner wall. A method of assembling the fuel rail assembly is also provided.

25 Claims, 3 Drawing Sheets

RETAINING CLIP AND ASSEMBLY FOR INTERNAL DAMPENING ELEMENT

FIELD OF THE INVENTION

This invention relates to pressure dampers for use in fuel delivery systems for engines for motor vehicles.

BACKGROUND OF THE INVENTION

In fuel rails for injector-based fuel injection systems, the various devices associated with the fuel system cause pressure waves in the fuel to propagate through the fuel rails. Such pressure waves, if occurring at the wrong time, may allow a small amount of fuel to leave the fuel rail and be injected into the engine at the time the injector is pulsed open. In addition, such pressure waves cause noise in the system that may be objectionable. Pressure pulses will give false readings to fuel pressure regulators by operating the regulator with a false indication of fuel pressure, which may result in fuel being bypassed and returned to the fuel tank.

A known pressure dampening system uses elastic walls forming the fuel supply line. As pressure pulses occur, the elastic walls function to dampen the pressure pulsations. Other pressure dampening systems use a pressure damper plugged in the end of a fuel rail with a pressure regulator at the other end. Still other pressure dampening systems use a compliant member operable to reduce peak pressure during injector firing events. The member is positioned in the fuel rail so as to not adversely affect the flow of fuel to an injector opening in the rail. The member is not free to rotate in the rail and the pressure pulses are dampened by the member, which is a pair of welded together shell halves with an enclosed airspace. Other pressure dampening systems use an in-line fuel pressure damper from the outlet of the fuel filter to the fuel rail. The damper is a pressure accumulator which operative to reduce transient pressure fluctuations induced by the fuel pump and the opening and closing of the fuel injectors.

Another dampening system utilizes an integral pressure damper that is attached to the fuel rail. The return tube is brazed to the rail and then at a convenient time in the assembly process the damper, which is a diaphragm, is attached to the return tube and crimped into position. The diaphragm operates to reduce audible operating noise produced by the injector pressure pulsations.

Still another dampening system uses a pulse damper in the fuel pump comprising a hollow body formed of a thin walled tube of flexible and resilient plastic material with heat sealed ends forming at least one chamber. The chamber carries a compressible gas to dampen pressure pulsations. Another dampening system uses a bellows modulator inside a gear rotor fuel pump for reducing pump noise by reducing the amplitude of fuel pressure pulses. Yet another system uses a bellows-like device at the junction of the lines of the flow path of the fluid from a fuel feed pump thereby forming a discontinuity in the flow path to reduce compressional vibrations of fuel being conveyed.

It would be beneficial to develop a dampening element that is relatively compact and inexpensive to manufacture and install.

BRIEF SUMMARY OF THE INVENTION

Briefly, the present invention provides a fuel rail assembly. The assembly comprises a generally hollow fuel rail, a fluid dampening element and a clip. The fuel rail has an inner wall and a longitudinal rail axis extending therethrough. The fluid dampening element is disposed within the fuel rail and has a cross-sectional configuration. The clip includes an interior portion having a cross-sectional opening corresponding to and surrounding the cross-sectional configuration of the fluid dampening element and a plurality of exterior portions extending from the interior portion. Each of the plurality of exterior portions has an engagement end distal from the interior portion, with at least one of the engagement ends engaging the inner wall.

The present invention also provides a clip for retaining a dampening element in a conduit. The clip comprises a generally planar member having an interior portion having an opening adapted to receive and retain the dampening element and a plurality of exterior portions extending from the interior portion. Each of the plurality of exterior portions has an engagement end distal from the interior portion.

A method of reducing pressure pulsations in a fluid conduit is also provided. The method comprises providing a fluid conduit assembly having a generally hollow fluid conduit having an inner wall and a longitudinal conduit axis extending therethrough; a fluid dampening element having a wall and a longitudinal dampening element axis extending therethrough, the fluid dampening element being located within the fluid conduit, the dampening element axis being generally parallel with the conduit axis; and a clip engaging the inner wall and generally circumscribing at least a portion of the fluid dampening element, the clip retaining the fluid damper element away from the inner wall. The method further provides flowing pressurized fluid through the fluid conduit.

Further, a method of assembling a fuel rail assembly is also provided. The method comprises providing an elongated element having a first end and a second end; compressing a wall of the elongated element between the first and second ends toward a longitudinal axis of the elongated element in at least two locations along a length of the element, forming at least one generally rounded portion; inserting a clip onto each of the first and second ends, forming a member subassembly; and inserting the member subassembly into a fuel rail such that each of the clips engage the fuel rail and retain the elongated element away from a wall of the fuel rail.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the futures of the invention. In the drawings.

DETAILED DESCRIPTION OF THE PREFERRED EMBODIMENTS

Figure 1:
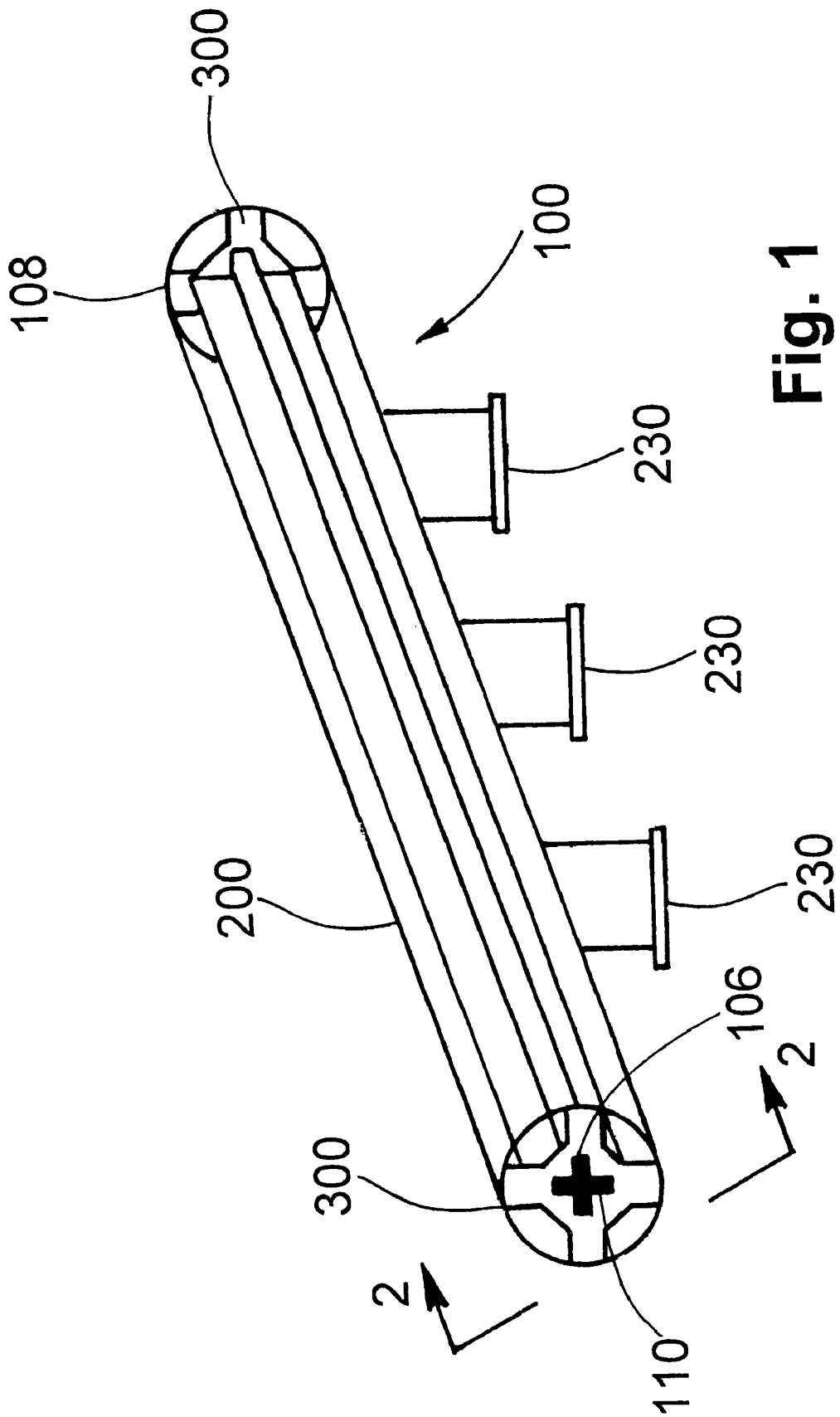
FIG. 1 is a perspective view of a dampening system according to a first preferred embodiment of the present invention, installed in a fuel line.
Figure 2:
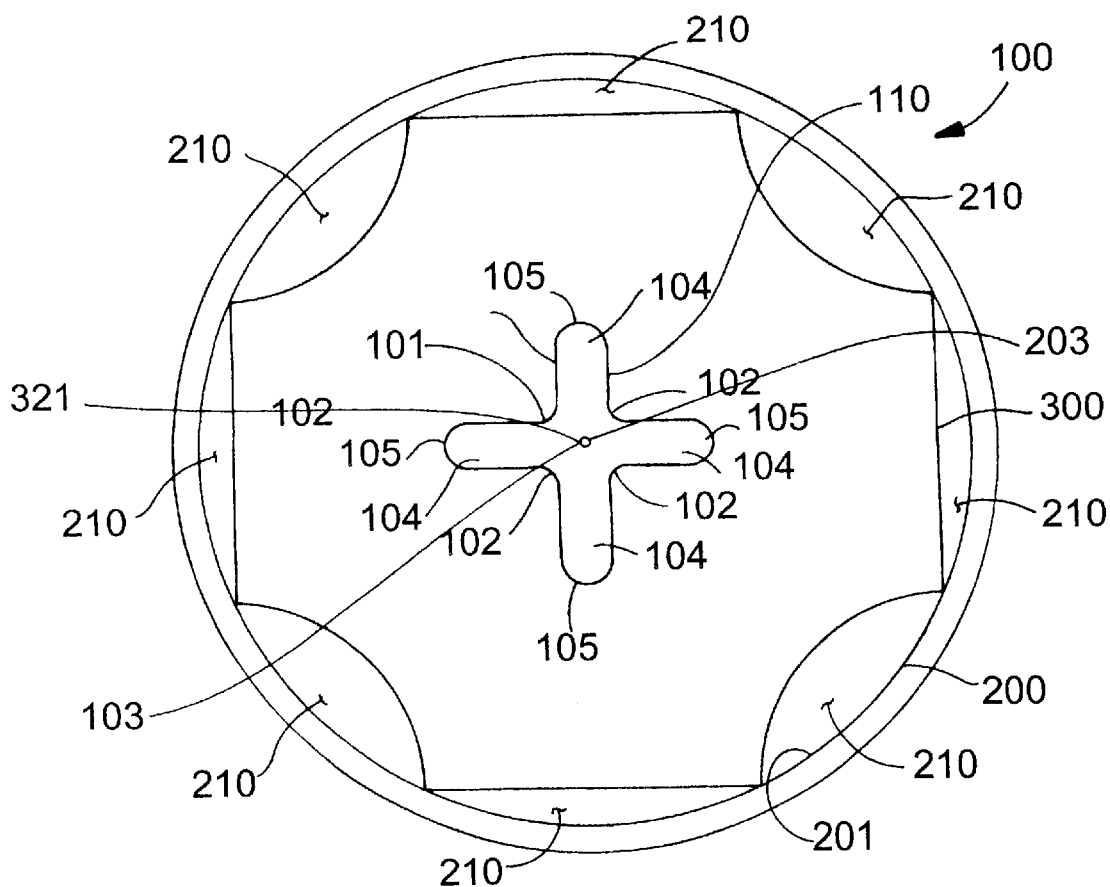
FIG. 2 is an end view of the dampening system taken along line 2—2 of FIG. 1.

A fluid conduit assembly 100 (hereinafter "assembly 100") according to a preferred embodiment of the present invention is shown in FIGS. 1 and 2. In the drawings, like numerals are used to indicate like elements throughout. The assembly 100 is comprised of a fluid or fuel dampening element 110, which is inserted into a conduit, or fuel rail 200. The dampening element 110 is supported in the fuel rail 200 by clips 300.

A preferred assembly 100 is disclosed in co-pending U.S. patent application Ser. No. 09/557,621, filed on Apr. 25, 2000, now allowed U.S. Pat. No. 6,314,942 which is owned by the assignee of the present invention, and is incorporate herein in its entirety by reference. The fuel rail 200 may be found in the fuel management system of a motor vehicle. In an integrated air-fuel module, the fuel rail assembly is a passageway or passageways for either or both a liquid such as gasoline or a non-liquid fluid, such as air or gas. This particular fuel rail 200 have a plurality of injector cups 230, each for receiving a fuel injector (not shown). The fuel rail 200 has an internal wall 201 which ha an internal perimeter, and a longitudinal rail axis 203 extending therethrough.

Preferably, the dampening element 110 is constructed from an elongated single piece of hollow, thin walled stainless steel tubing, Inconel, or electrodeposited nickel, although those skilled in the art will recognize that the dampening element 110 can be constructed from other suitable materials as well, so long as the material can withstand the fluids or fuels that are transported by the fuel rail 200. Additionally, the dampening element 110 can be other shapes instead of tubular, including box-shaped, or other suitable shapes. In the preferred embodiment, the dampening element 110 originates as a tubular piece having an exterior wall 101. The exterior wall 101 is compressed toward a longitudinal axis 103 of the dampening element 110 at four locations 102 along the length of the dampening element 110. Preferably, the wall 101 is compressed by pinching the wall 101 toward the longitudinal axis 103 using pins and rollers, although those skilled in the art will recognize that other tools and techniques, such as using interior and exterior dies, can be used. Alternatively, the dampening element 110 can be formed by extrusion, as is well known in the art.

By compressing the wall 101 at four locations, four generally rounded or semi-elliptical portions or lobes 104 which extend from the longitudinal axis 103 are formed along the length of the dampening element 110, such that a cross-sectional configuration of the dampening element 110, as shown in FIG. 2, gives the appearance of a cross. A tip 105 on the wall 101 of each lobe 104 is preferably approximately a same first distance from the longitudinal axis 103 as the tip 105 on the wall 101 of each other lobe 104, and all locations on the wall 101 between adjacent lobe tips 105 are less than the first distance from the longitudinal axis 103. Referring back to FIG. 1, first and second ends 106, 108 of the dampening element 110 are pinched together and sealed, preferably by a laser weld, although those skilled in the art will recognize that the first and second ends 106, 108 can be sealed by other methods, such as, for example, chemical bonding, as well.

Preferably, the dampening element 110 has a nominal outside diameter of approximately 9.5 mm (⅜ inches), a wall 101 thickness of approximately 0.15 mm (0.006 inches) and a length of approximately 127 mm (5 inches). However, those skilled in the art will recognize that the thickness and length of the wall 101 can be other dimensions as well. The wall 101 is very thin, hence very sensitive to pulsed pressure signals. The function of the dampening element 110 is to receive the pulsed fuel pressure signals in compression by compressing or when in tension by expanding, to smooth out pressure peaks so as to reduce the pressure pulsations in the fuel rail 200 and to provide a relatively laminar flow of the fuel or fluid in the fuel rail 200 and into each injector as the respective injector is opened. The dampening element 110, having its lobes 104 formed from the wall 101, provides the resiliency necessary to absorb the pressure pulses. The pressure pulses, acting on the plurality of the lobes 104, operate to compress or stretch the lobes 104, which thereby absorb the pulsed pressure. The lobes 104 may be in either a compression mode or in a tension mode. The relatively large amount of surface area of the wall 101 within a small volume inside the fuel rail 200 provides a large surface area for absorbing the pulsed pressure signals. Preferably, the fuel rail 200 is constructed from one of steel, plastic, extruded aluminum, semi-solid cast aluminum, or other suitable material for transporting fuel for an internal combustion engine.

Figure 3:
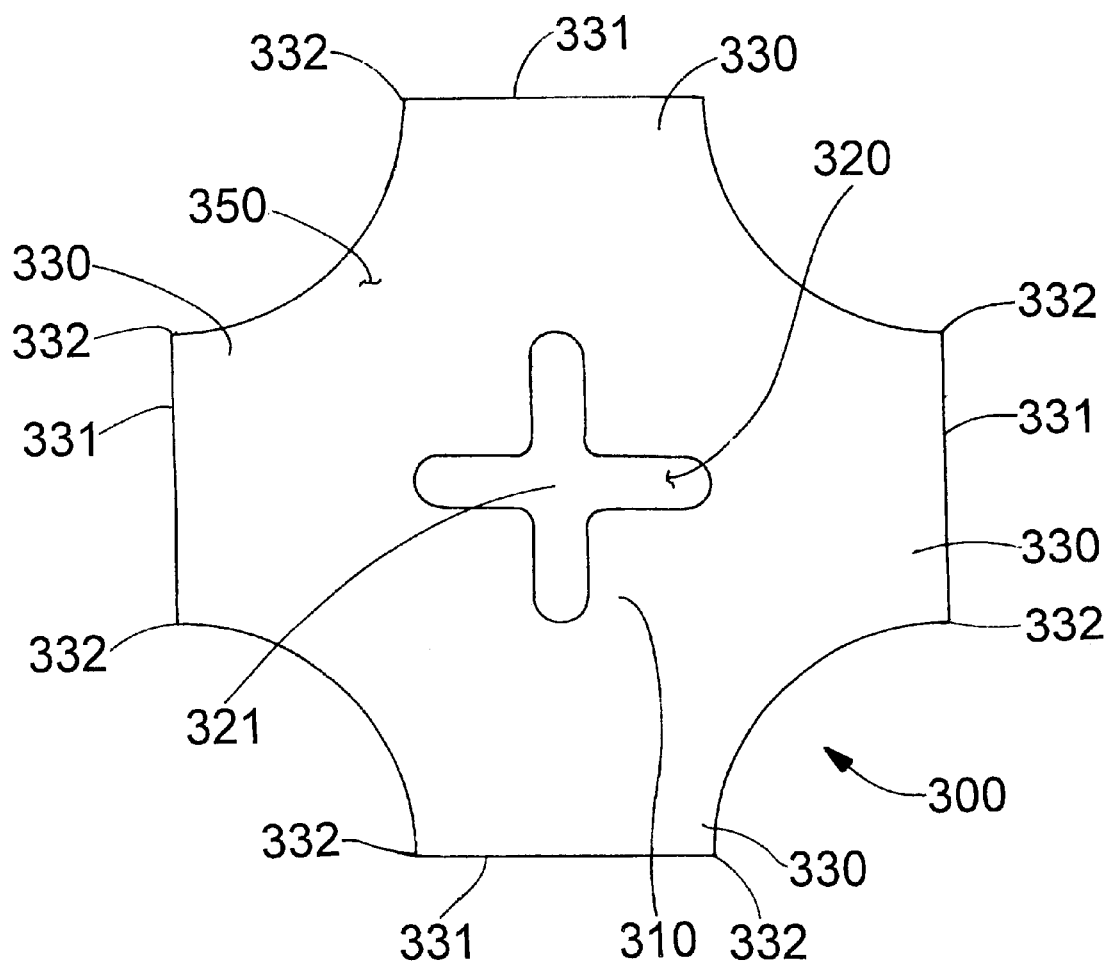
FIG. 3 is a front view of a clip according to a first preferred embodiment of the present invention.
Figure 4:
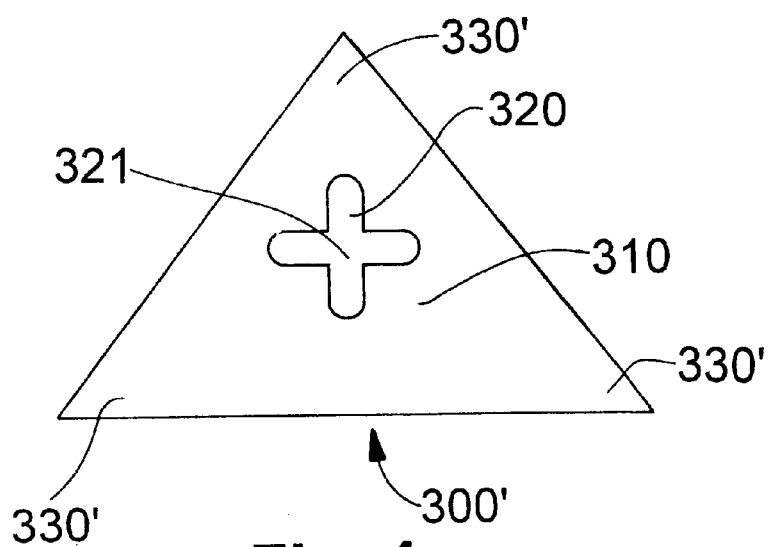
FIG. 4 is a frontal view of a clip according to a second preferred embodiment of the present invention.

The clip 300 is inserted over each of the first and second ends 106 of the dampening element 110. The clip 300 is a generally planar member and includes an interior portion 310 having an opening 320. Preferably, the cross sectional area of the opening 320 corresponds to the cross-sectional configuration of the dampening element 110 and is adapted to receive and retain the dampening element 110 with little or no play between the dampening element 110 and the opening 320. Also preferably, an axis 321 is centrally located within the opening 320. A plurality of exterior portions 330 extend generally radially outwardly from the interior portion 310. Preferably, as shown in a first preferred embodiment in FIG. 3, four exterior portions 330 extend from the interior portion 310. However, for a clip 300', those skilled in the art will recognize that other numbers of exterior portions 330', such as three, can extend from the interior portion 310, as is shown in FIG. 4.

Referring back to FIG. 3, each exterior portion 330 ends in an engagement end 331 which is distal from the interior portion 310. Also preferably, each engagement end 331 comprises at least one engagement point 332, such that each engagement point 332 engages the internal wall 201 of the rail 200. The design of the clip 300 provides point contact with the internal wall 201 of the fuel rail 200 minimizes contact area between the internal wall 201 of the fuel rail 200 and the clip 300. Such a design minimizes pressure drop as a function of fuel flow through and around the clip 300.

Figure 5:
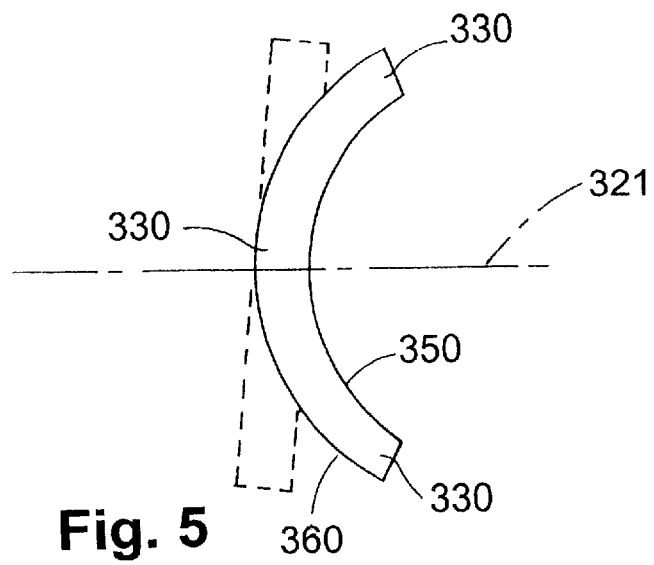
FIG. 5 is a side view of the clip shown in FIG. 3.

The clip 300 also includes a first surface 350 which contains the interior portion 310 and the exterior portions 330. The first surface 350 is generally curved toward the axis 321, as shown in FIG. 5. The clip 300 also includes a second surface 360 which is juxtaposed from the first surface 350. The second surface 360 is generally parallel to the first surface 350. Preferably, the first and second surfaces 350, 360 are spaced approximately 0.25 millimeters apart. Also preferably, the curvature of the first and second surfaces 350, 360 is formed by taking the clip 300 as a flat sheet, shown by dashed lines in FIG. 5, and bending the clip 300 to the position shown in FIG. 5. The curved, or bowed shape of the clip 300 ensures that once the clip 300 is in place in the assembly 100, the clip 300 is securely pressed against the inner wall 201 of the fuel rail 200, preventing unnecessary vibration of the components 200, 300 against each other.

Preferably, the clip 300 is constructed from stainless steel or a spring steel, although those skilled in the art will recognize that the clip 300 can be constructed from other, suitable materials. Although not shown, those skilled in the art will recognize that through holes can be formed in the clip from the first surface 350 to the second surface 360, to increase fluid flow through the clip 300.

Preferably, the clip 300 centers the dampening element 110 in the fuel rail 200 so that the longitudinal rail axis 203 is generally co-linear with the element longitudinal axis 103. In such an arrangement, the clip 300 retains the dampening element 110 away from the internal wall 201 of the rail 200 so that the dampening element 110 does not touch or otherwise engage the rail 200. As shown in FIG. 2, with the clip 300 retaining the dampening element 110 away from the internal wall 201 of the rail 200, a plurality of fuel flow passages 210 are formed in the rail 200.

To assemble the assembly 100, the wall 101 of the dampening element 110 is compressed between the first and second ends 106, 108 toward the longitudinal axis 103 in at least two, preferably four locations, along a length of the dampening element 110, forming at least one, and preferably four rounded portions or lobes 104. A clip 300 is then inserted over each end 106, 108 of the dampening element 110, such that the first face 350 of the clip 300 at the first end 106 faces the first face 350 of the other clip 300 at the second end 108.

The dampening element 110, with the clip 300 installed on each end 106, 108, respectively, is installed in an open end of the fuel rail 200 such that the longitudinal axis 103 of the dampening element 110 is generally parallel to the longitudinal axis 203 of the fuel rail 200. Preferably, the fuel rail 200 has a nominal 19 mm (¾ inch) diameter. When using a dampening element 110 having an outside diameter of approximately 9.5 mm. the ratio of the diameter of the fuel rail 200 to the dampening element 110 is approximately 2:1. Once the assembly 110 is assembled as described above, pressurized fuel flows through the fuel rail 200 in the areas 210 within the fuel rail 200 which are not occupied by the dampening element 110 or the clip 300. Preferably, the fuel flows in the space 210 between the inner wall 201 of the fuel rail 200 and the clip 300.

An additional benefit of the preferred embodiment of the dampening element 110 is that the dampening element 110 provides internal structural support to the fuel rail 200. In the event that an external compression force is applied to the fuel rail 200, the dampening element 110 acts as a stiffener which may prevent the fuel rail 200 from totally collapsing.

Preferably the dampening element 110 is used in non-return fuel systems, although those skilled in the art will recognize that the dampening element 110 can be used in any type of fuel system in which pressure pulsations would potentially occur.

Although a dampening element 110 having four lobes is preferred, other embodiments of dampening elements with less than or more than four lobes can be used, as is described in detail in U.S. patent application Ser. No. 09/557,621. Those skilled in the 209 art will recognize that the opening 320 in the clip 300 must be modified to match the number of lobes in the other embodiments.

The use of dampening element 110 has been shown in a fuel rail 200, although such a damper may be positioned in other parts of a fuel or fluid systems such as in cooperation with molded passageways. Such other areas are in pressure regulators, fuel pump motors or any place wherein pressure pulses occur.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A fuel rail assembly comprising:
   a generally hollow fuel rail having an inner wall and a longitudinal rail axis extending therethrough;
   a fluid dampening element disposed within the fuel rail and having a cross-sectional configuration; and
   a clip including:
      an interior portion having a cross-sectional opening corresponding to and surrounding the cross-sectional configuration of the fluid dampening element; and
      a plurality of exterior portions extending from the interior portion, each of the plurality of exterior portions having an engagement end distal from the interior portion, at least one of the engagement ends engaging the inner wall.

2. The fuel rail assembly according to claim 1, wherein the fluid dampening element further comprises a wall and a longitudinal dampening element axis extending therethrough, the dampening element axis being generally parallel with the rail axis.

3. The fuel rail assembly according to claim 2, wherein the rail axis is generally co-linear with the dampening element axis.

4. The fuel rail assembly according to claim 1, wherein the clip retains the fluid dampening element away from the inner wall.

5. The fuel rail assembly according to claim 1, further comprising at least one flow path between the inner wall and the clip.

6. The fuel rail assembly according to claim 1, wherein the fluid dampening element has a first end and a second end, distal from the first end, and the clip comprises a first clip disposed at the first end and a second clip disposed at the second end.

7. The fuel rail assembly according to claim 1, wherein the clip further comprising:
   a central axis;
   a generally planar member having:
      an interior portion having an opening disposed on the central axis and adapted to receive and retain the dampening element; and
      a plurality of exterior portion extending from the interior portion, each of the plurality of exterior portions having a cantilever surface oblique to the central axis, the cantilever surface having an engagement end distal from the interior portion.

8. The clip according to claim 7, wherein each engagement end is adapted to engage the conduit.

9. The clip according to claim 8, wherein each engagement end comprises at least one engagement point.

10. The clip according to claim 7, further comprising a generally curved first surface containing the interior portion and the plurality of exterior portions.

11. The clip according to claim 7, further comprising a generally curved second surface juxtaposed from the first surface.

12. The clip according to claim 7, wherein the clip is comprised of one of stainless steel and spring steel.

13. The clip according to claim 7, wherein the plurality of exterior portions comprises three exterior portions.

14. The clip according to claim 7, wherein the plurality of exterior portions comprises four exterior portions.

15. A method of assembling a fuel rail assembly comprising:
    providing an elongated element having a first end and a second end;

compressing a wall of the elongated element between the first and second ends toward a longitudinal axis of the elongated element in at least two locations along a length of the element, forming at least one generally rounded portion;

inserting a clip onto each of the first and second ends, forming a member subassembly; and inserting the member subassembly into a fuel rail such that each of the clips engage the fuel rail and retain the elongated element away from a wall of the fuel rail.

16. The method according to claim 15, wherein the method further comprises flowing pressurized fluid through the fuel rail, the fuel rail including a generally hollow fluid conduit having an inner wall and a longitudinal conduit axis extending therethrough, the elongated element including a fluid dampening element having a wall and a longitudinal dampening element axis extending therethrough, the fluid dampening element being located within the fluid conduit, the dampening element axis being generally parallel with the conduit axis; and wherein the clip further comprising:

an interior portion disposed on the dampening axis and a plurality of exterior portion extending from the interior portion, each of the plurality of exterior portion having a cantilever surface, the cantilever surface engaging the inner wall and generally circumscribing at least a portion of the fluid dampening element, the clip retaining the fluid dampening element away from the inner wall.

17. The method according to claim 16, further comprising flowing the pressurized fluid between the inner wall and the clip.

18. The method according to claim 15, wherein the clip further comprising:

a central axis;

a generally planar member having:
   an interior portion having an opening disposed on the central axis and adapted to receive and retain the dampening element; and
   a plurality of exterior portion extending from the interior portion, each of the plurality of exterior portions having a cantilever surface oblique to the central axis, the cantilever surface having an engagement end distal from the interior portion.

19. The method according to claim 18, further comprising a generally curved first surface containing the interior portion and the plurality of exterior portions.

20. The method according to claim 18, further comprising a generally curved second surface juxtaposed from the first surface.

21. The method according to claim 18, wherein the clip is comprised of one of stainless steel and spring steel.

22. The method according to claim 18, wherein the plurality of exterior portions comprises three exterior portions.

23. The method according to claim 18, wherein the plurality of exterior portions comprises four exterior portions.

24. The method according to claim 18, wherein each engagement end is adapted to engage the conduit.

25. The method according to claim 24, wherein each engagement end comprises at least one engagement point.

* * * * *